(12) United States Patent     (10) Patent No.: US 7,564,505 B2
Kitabayashi     (45) Date of Patent: Jul. 21, 2009

(54) OPTICAL DEVICE AND PROJECTOR EQUIPPED WITH THE SAME

(75) Inventor: Masashi Kitabayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 11/788,960

(22) Filed: Apr. 23, 2007

(65) Prior Publication Data

US 2007/0258051 A1    Nov. 8, 2007

(30) Foreign Application Priority Data

Apr. 24, 2006    (JP)  ............................. 2006-119022

(51) Int. Cl.
*G02F 1/1335* (2006.01)
*G02F 1/1333* (2006.01)
*G03B 21/16* (2006.01)

(52) U.S. Cl. ................................ 349/5; 349/58; 353/52

(58) Field of Classification Search ............... 349/5–10, 349/58–60, 161; 353/20, 52–61, 119
See application file for complete search history.

(56) References Cited

U.S. PATENT DOCUMENTS

| | | | | |
|---|---|---|---|---|
| 6,056,407 | A | * | 5/2000 | Iinuma et al. ................ 353/119 |
| 6,834,964 | B2 | * | 12/2004 | Nishihara et al. ............. 353/52 |
| 6,854,848 | B2 | | 2/2005 | Fujimori et al. |
| 6,935,745 | B1 | | 8/2005 | Kitabayashi et al. |
| 2002/0057419 | A1 | * | 5/2002 | Fujimori et al. ................ 353/53 |
| 2004/0246390 | A1 | * | 12/2004 | Yanagisawa ................... 349/5 |
| 2005/0162621 | A1 | * | 7/2005 | Shirota ......................... 353/81 |

FOREIGN PATENT DOCUMENTS

| | | |
|---|---|---|
| JP | 2002-139795 A | 5/2002 |
| JP | 2003-262917 | 9/2003 |
| JP | 2005-234124 A | 9/2005 |
| JP | 2005-346089 | 12/2005 |

* cited by examiner

*Primary Examiner*—Frank G Font
*Assistant Examiner*—Robert Tavlykaev
(74) *Attorney, Agent, or Firm*—AdvantEdge Law Group, LLC

(57) ABSTRACT

An optical device includes a plurality of light modulators that modulate a plurality of color light components according to image information about each color light component and a combining optical unit that combines modulated color light components involving corresponding images for color light components irradiated out of the light modulators and irradiates combined-modulated light components outside through the irradiating surface. The light modulators face each other through incident surfaces which the modulated color light components pass through, other than the irradiating surface of the combining optical unit having an upside and bottom and a plurality of sides, and parts of the light modulators are supported by supporting substrates of a plate that are mounted at the upside and bottom.

6 Claims, 6 Drawing Sheets

US 7,564,505 B2

OPTICAL DEVICE AND PROJECTOR EQUIPPED WITH THE SAME

BACKGROUND

1. Technical Field

The present invention relates to an optical device that creates optical images in response to image signals and a projector equipped with the optical device.

2. Related Art

A projector that project images onto a screen on the wall require high luminance for bright images and a reasonable price with small-size. High luminance is for users' demand for clear images even at the bright surroundings and small-size with a reasonable price is for the demand from home. Further, as image sources from ground wave digital broadcasting have recently increased in resolution, high resolution is required for projector.

As for such projector, the projector that used three LCD have been on the market. Projector is each equipped with a built-in optical device for creating optical images in response to image signals and the image quality of the projectors depends on the performance of the optical device.

An optical device for the projector that used three LCD is configured by three light modulators of transmissive liquid crystal panels for each primary color of light components, i.e. red R, green G, and blue B, and a combining optical unit that combines converted-color light components to produce each color image out of corresponding light modulators and then irradiates the combined-modulated light components with full color.

FIG. 5 is a perspective assembly view of an optical device in the related art.

An optical device for projector that used three LCD is disclosed in JP-A-2005-234124. FIG. 5 shows the attachment structure of only the light modulator 236R for a R-light component to simplify explanation.

An optical device 210 includes a combining optical unit 220 that is formed of a cubic glass prism and light modulators 236R, 236G, 236B (236G and 236B are not shown) that are mounted at incident surfaces Sr, Sg, Sb of three sides, except a irradiating surface So, of the combining optical unit. The light modulator 236R operates as a transmissive liquid crystal panel including a liquid crystal light valve 234R, a irradiating polarizing plate 232R, and an incident polarizing plate (not shown), and the incident polarizing plate is not shown in the figure.

A transparent reinforcing plate 231 with the irradiating polarizing plate 232R bonded and the liquid crystal light valve 234R are supported by a metallic fixing frame 230 fixedly bonded to the incident surface Sr and fixed to the combining optical unit 220 by an intermediate frame 233 and fixing pins 235.

The fixing frame 230 has a U-shape when seen from above and the bottom of the U-shape is bonded to the incident surface Sr. Further, a rectangular opening is formed through the bottom to allow a modulated R-light component out of the light modulator 236R to pass through the fixing frame 230 and the frame-shaped periphery of the opening is bonded to the incident surface Sr as the bonding area.

The light modulators on the incident surfaces Sr, Sg, Sb of the combining optical unit 220 irradiate modulated R-light component, G-light component, and B-light component, respectively. The modulated light components that have entered inside the combining optical unit 220 are reflected from and combined by dielectric multilayer films fa, fb in the combining optical unit 220 formed into an assembly of four prisms and then irradiated as a combined-modulated light component to produce a full color image through the irradiating surface So.

However, in the optical device 210, since the fixing frames 230 are bonded to the incident surfaces Sr, Sg, Sb of the combining optical unit 220, an area for bonding the fixing frame is needed for each incident surface. Accordingly, the combining optical unit 220 was large in size. The cost for the combining optical unit 220 is proportional to the size, so that the cost increases with increase in size.

Further, the color light components entering the optical device 210 have high luminous flux density due to the demand for high luminance, so that the optical device 210 requires cooling for discharging heat from light modulation loss. In particular, it has a problem that how to cool the irradiating polarizing plates that are difficult to cool because they are adjacent to the light optical device 220. However, the periphery of the reinforcing plate 231 with the irradiating polarizing plate 232R bonded is supported by the fixing frame 230 with heat conductive, but most planes, other than the periphery, are in contact with air at the front and rear surfaces and not directly contact with the combining optical unit 220 with high heat discharge efficiency, so that it was difficult to sufficiently cool the irradiating polarizing plates.

As described above, the optical device 210 had problems that it was difficult to decrease the size and the cost and sufficiently cool the irradiating polarizing plates 232.

FIG. 6 is a perspective assembly view of another optical device in the related art.

An optical device 250 designed to overcome the problems accompanying the optical device 210 is disclosed in JP-A-2002-139795. FIG. 6 also shows only the attachment structure of a light modulator 236R for a R-light component and incident polarizing plates are not shown. Further, the same parts as those in FIG. 5 are represented by the same reference numerals.

According to the optical device 250, a supporting substrate 270 formed of a transparent plate with a irradiating polarization plate 232R bonded in advance is fixedly bonded to the incident surface Sr of a combining optical unit 260. Made of a high heat conductive material such as crystal or sapphire, the supporting substrate 270 is larger than the height of the combining optical unit 260.

A fixing frame 272 having pins for fitting at four corners is fixedly bonded to the supporting substrate 270 and a liquid crystal light valve 234R is fixed by the four pins on the fixing frame.

The fixing frame 272 is bonded to the supporting substrate 270 at the portions protruding up and down beyond the combining optical unit 260 as a major boding area. Therefore, it is possible to decrease the combining optical unit 270 as much as the boding area, so that the size and cost of the combining optical unit 260 are reduced. Further, the cooling efficiency for the irradiating polarizing plate 232R is improved from a structure that the irradiating polarizing plate 232R is in close contact with the supporting substrate 270 with high heat conductivity and they are integrally formed with the combining optical unit 260 with high heat discharge efficiency.

Further, in assembling the optical devices 210, 250, each light modulator for corresponding incident surfaces Sr, Sg, Sb of the combining optical units 220, 260 should be precisely adjusted in position to combine each modulated color light component with corresponding pixels (hereinafter, referred to as alignment).

However, in the optical device 210 in the related art, since the light modulators are supported by the metallic frames 230 bonded to the incident surfaces Sr, Sg, Sb, pixel displacements might be caused by changes in temperature. The pixel displacement appears when the coefficient of thermal expansions of the combining optical unit 220 made from mainly glass and the metallic frames 230 are different, or when the facial dimensional changes due to changes in temperature appear in the alignment direction for the light modulator 236R. In detail, when the dimension changes, relative displacements appear in the light modulator 236R aligned with respect to the combining optical unit 220 and pixel displacements correspondingly appear. Further, as it is required for the projectors to be small-sized and have high resolution for image sources, the pitches between pixels narrow in the light modulator. Accordingly, even though the changes in dimension are the same, the ratio of pixel displacement increases.

Further, for the optical device 250 as well, since the coefficient of thermal expansion is different between the combining optical unit 220 of glass and the supporting substrate 270 of crystal or sapphire and the supporting substrate 270 is bonded to the incident surface Sr of the combining optical unit 260, pixel displacement due to changes in temperature might be caused.

As described above, optical devices in the related art have a problem in that pixel displacements may be caused by changes in temperature.

In order to overcome the above problems, an advantage of the invention is to provide an optical device that reduces pixel displacements with simple configuration and a projector equipped with the optical device.

SUMMARY

An advantage of some aspects of the invention is that it provides an optical device that includes a plurality of light modulators that modulate a plurality of color light components according to image information about each color light component and a combining optical unit that combines modulated color light components involving corresponding images for color light components irradiated from the light modulators and irradiates combined-modulated light components outside through the irradiating surface. The light modulators may each face corresponding incident surfaces which the modulated color light components pass through, other than the irradiating surface of the combining optical unit having an upside and bottom and a plurality of sides, and parts of the light modulators may be supported by supporting substrates of a plate that are mounted at the upside and bottom.

According to the above configuration, while the light modulators each face corresponding incident surfaces which the modulated color light components pass through, other than the irradiating surface of the combining optical unit having an upside and bottom and a plurality of sides, parts of the light modulators are supported by supporting substrates of a plate that are mounted at the upper and lower surfaces.

As for optical devices in the related art, because supporting members for light modulators are mounted on the incident surfaces of the combining optical unit, the change of the supporting members in the dimension in the plane direction generated by the change in temperature due to difference in coefficient of thermal expansion with respect to the combining optical unit conformed to the alignment direction of the optical modulators. However, in an optical device according to an aspect of the invention, even though the coefficient of thermal expansion of supporting substrates is different from that of a combining optical unit, changes in plane dimension of the supporting substrates appear perpendicular to the alignment of the light modulators.

Accordingly, it may be possible to reduce image displacements by simple configuration that the supporting substrates are mounted to the upside and bottom of the combining optical unit.

Therefore, an optical device with reduced pixel displacements can be provided by a simple configuration.

For an optical device according to an aspect of the invention, a supporting substrate may be made of a transparent material with the same coefficient of thermal expansion as a combining optical unit.

According to the above configuration, since the supporting substrate is made of a material having the same coefficient of thermal expansion as the combining optical unit, the ratio of changes in dimension and temperature is the same as the combining optical unit, which is the same configuration that the light modulators are bonded directly to each incident surface of the combining optical unit.

Therefore, it is possible to prevent relative displacement of the light modulators to the combining optical unit and reduce pixel displacements accordingly.

Further, when the light modulators are attached to corresponding incident surfaces of the combining optical unit, for example, parts of the light modulators are attached to metallic fixing frames by fixing the fixing frames to sides of the supporting plates. A UV-ray curable resin is used as an adhesive for fixing the fixing frames to the sides of the supporting substrates. The substrates according to an aspect of the invention are transparent, but in bonding the fixing frame, when UV rays enter the combining optical unit through sides of the irradiating surfaces of the supporting substrates, the UV rays reflect off the surfaces of the supporting substrates and are transmitted to the sides of the incident surfaces, so that the UV-ray curable resins are solidified.

Accordingly, when the supporting substrates are used as a light guide body in bonding the fixing frames to the combining optical unit, high assembly efficiency can be achieved.

Therefore, an optical device with improved assembly efficiency and reduced pixel displacements can be provided.

An optical device according to an aspect of the invention includes a plurality of heat discharge plate that is formed of a transparent plate having higher heat conductivity than the combining optical unit and substantially the same in size as each of the incident surfaces. The light modulators each may be a liquid crystal panel having incident and irradiating polarizing plate, the heat discharge plate may be bonded to each incident surface of the combining optical unit, and the irradiating polarizing plate may be in close contact with the heat discharge plate.

According to the above configuration, since the heat discharge plates integrally formed with the irradiating polarizing plates are bonded to the incident surfaces of the combining optical unit, the irradiating polarizing plates are integrally formed with the combining optical unit through the heat discharge plate.

Accordingly, it may be possible to discharge heat from the irradiating polarizing plates, which is difficult to cool because they are disposed close to the light combination optical device, to the combining optical unit with large heat capacity, so that it may be possible to ensure performance of the irradiating polarizing plates.

Further, since heat conductivity of the heat discharge plate is larger than that of the combining optical unit, it may be possible to transmit effectively the heat of the irradiating polarizing plates to the combining optical unit.

Therefore, an optical device with high reliability can be provided.

In order to achieve the above-mentioned advantages, a projector according to an aspect of the invention includes the above-mentioned optical device, a light source unit that supplies light to the optical device, and a projecting unit that projects combined-modulated light components irradiated through the irradiating surface of the optical device in a magnification scale.

According to the above configuration, the projector is provided with the highly reliable optical device that reduces pixel displacements with simple configuration.

Therefore, a projector that projects clear images with high reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described in detail hereafter with reference to the accompanying drawings.

Embodiments

Outline of Projector

Figure 1:
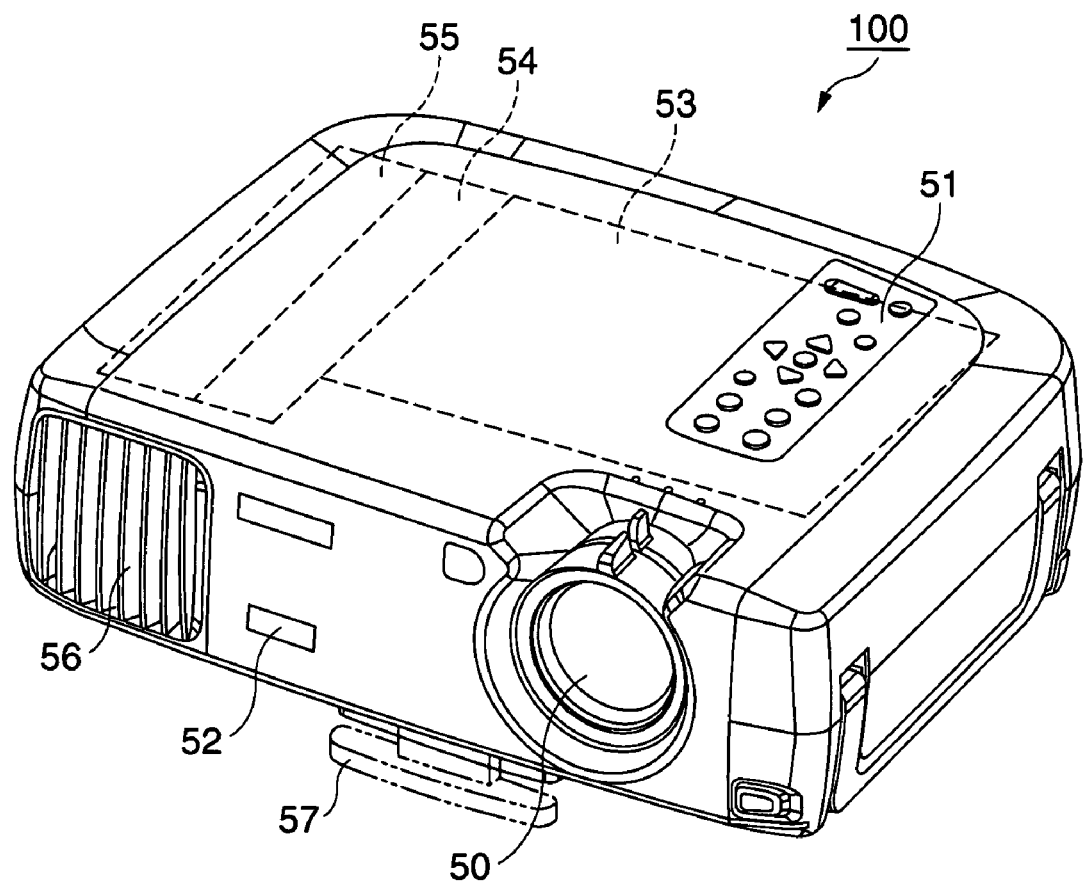
FIG. 1 is a perspective view of a projector according to an embodiment of the invention.
Figure 2:
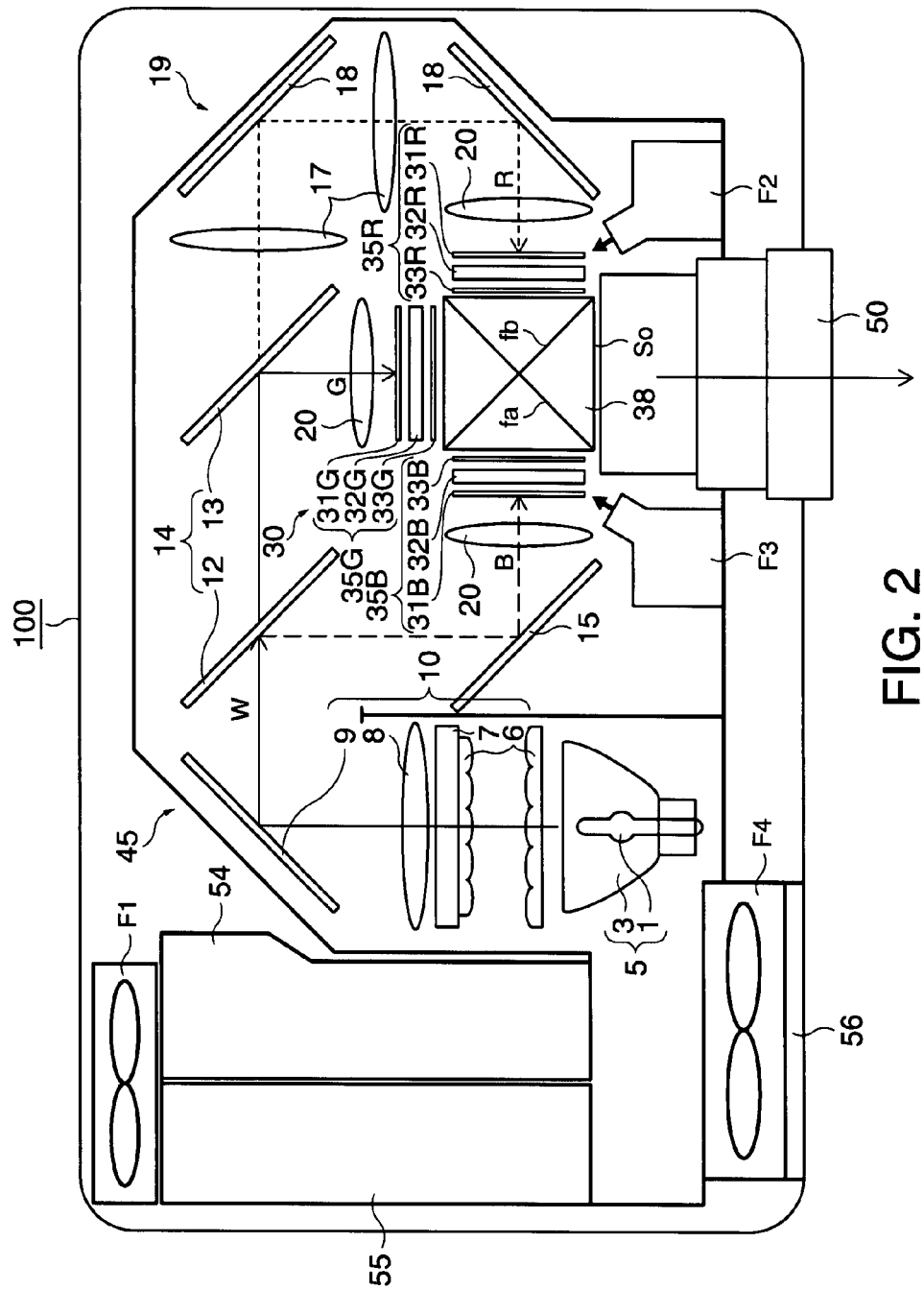
FIG. 2 is a schematic plan view of an optical system.

FIG. 1 is a perspective view of a projector according to an embodiment of the invention. FIG. 2 is a schematic plan view of an optical system for the projector of the embodiment of the invention. A projector 100 is now schematically described with reference to FIGS. 1 and 2.

According to the projector 100, an optical device 30 with a plurality of light modulators modulates light components irradiated from a light source unit 5 having a light source of a discharge lamp, such as a high-pressure mercury lamp or a metal halide lamp, in response to image signals, and a projecting unit 50 projects the modulated light components to display images in a magnification scale.

The projector 100 is composed of an optical unit 45 including the light source unit 5 and the optical device 30, the projecting unit 50, an operating unit 52, a light receiving unit 52, a circuit unit 53, a power unit 54, a lamp operating unit 55, an exhausting unit 56, and a leg 57. The optical unit 45 including the light source unit 5 and the optical device 30 will be described later.

The operating unit 51 is disposed on the upper surface of the projector 100. The operating unit 51 is an operating panel with a plurality of buttons including a power button and a menu button for displaying an operating menu for projected image adjustment. Further, the projector 100 has a remote controller (not shown) with operating buttons the same as those of the operating unit 51.

The light receiving unit 52 is a receiving unit that receives operating signals by infrared rays out of the remote controller, without wires.

The circuit unit 53 includes a CPU (Central Processing Unit) that controls the operation of the projector 100 in response to signals out of the operating unit 51 and the light receiving unit 52, a processor that performs various image processes for converting the inputted image signals into other image signals (information) suitable to be projected to the projector, and a liquid crystal driver that drives a plurality of liquid crystal light valves of the light modulators.

The power unit 54 receives AC power from an outside power source through the inlet and supplies steady power to each unit of the projector 100, including the circuit unit 53, by process of transformation, rectification, and collimating etc. in a built-in AC/DC transformation unit (not shown).

The lamp operating unit 55 includes an igniter circuit that generates a high voltage for turning on the discharge lamp 1 and forms a discharge path and a ballast circuit (not shown) that keeps the turned-on discharge lamp 1 stable.

The exhaust unit 56 is an exhaust port that discharges heat from the heat generating units, such as the discharge lamp 1, outside the projector 100. The exhaust port 56 is equipped with an axial exhaust fan F4 for exhaustion.

The leg 57 is retractable to locate projected images at a desired position on a screen on the wall by adjusting the projecting direction of the projecting unit 50, when the projector 100 is placed on a desk etc. Accordingly, a user is provided with convenience because he/she can adjust the position where projected images are displayed, by adjusting the length of one leg 57.

Schematic Configuration of Optical System

The optical unit 45, an optical system of the projector 100, is now mainly described with reference to FIG. 2.

The optical unit 45 is largely composed of a light source unit, a uniform illumination optical system 10, a color separation optical system 14, a relay optical system 19, and an optical device 30.

The light source unit 5 includes the discharge lamp 1 with high luminance, such as a high-pressure mercury lamp or a metal halide lamp, and a reflector 3 that condenses the light components out of the discharge lamp 1 and sends them to the optical unit.

The uniform illumination optical system 10 is composed of two fly-eye lenses 6, a polarized-light converting element 7, a condenser lens 8, and a reflecting mirror 9.

The fly-eye lenses 6 are formed of rectangular small lenses arranged into a matrix when seen from the light source unit 5 and two fly-eye lenses are disposed. Each small lens divides luminous flux irradiated out of the light source unit 5 into partial luminous flux and sends it in the light axial direction. A plurality of light source images out of the small lenses overlap at image forming regions of the light modulators 35R, 35G, 35B across the condenser lens 8. Accordingly, luminance is uniformly distributed on the image forming regions of the light modulators 35R, 35G, 35B.

The polarized-light converting element 7 is composed of a PBS array (Polarization Beam Splitter) and a half-wavelength plate and converts random polarized light components into predetermined straight polarized light components. The predetermined straight polarized light components are desired light components that can enter the incident polarizing plates 31R, 31G, 31B on the incident surfaces of the light modulators 35R, 35G, 35B, so that light components, which can not pass through the incident polarizing plates and are converted into useless heat when the polarized-light converting element 7 is not installed, are useful. A light component irradiated from the light source unit 5 sequentially passes through the two fly-eye lenses 6, the polarized-light converting element 7, and the condenser lens 8, and then reflects off the reflecting mirror 9 into the color separation optical system 14. A condenser lens is disposed behind the reflecting mirror 9.

The color separation optical system 14 includes a dichroic mirror 12 and a dichroic mirror 13.

The dichroic mirror 12, an optical element that is made by forming a dichroic film that reflects a B-light component and transmits R- and G-light components onto a glass plate, reflects a B-light component to the reflecting mirror 15 and transmits R- and G-light components. The B-light component that has reflected from the reflecting mirror 15 enters the light modulator 35B of the optical device 30 after collimated across a corresponding collimating lens 20. The R- and G-light components that have passed through the dichroic mirror 12 enter the dichroic mirror 13.

The dichroic mirror 13, an optical element with a dichroic film that reflects a G-light component and transmits an R-light component, reflects the G-light component into the optical device 30 and transmits the R-light component. The G-light component that has reflected off the dichroic mirror 13 enters the optical modulator 35G of the optical device 30 after collimated across a corresponding collimating lens 20. The R-light component that has passed through the dichroic mirror 13 enters the relay optical system 19.

The relay optical system 19 is composed of two relay lenses 17 and two reflecting mirrors 18.

The R-light component that has passed through the dichroic mirror 13 is reflected from the reflecting mirror 18 across a relay lens 17 and is reflected from once again the other reflecting mirror 18 across the other relay lens 17, and then enters the light modulator 35R of the optical device 30 after collimated across a corresponding collimating lens 20. The two relay lenses 17 are installed to prevent attenuation of the R-light component that travels along the longest light path of the three split light components.

The optical device 30 is composed of the light modulators 35R, 35G, 35B for each color light component and combining optical units of a cross dichroic prism 38. The optical device 30 further includes supporting substrates for fixing the light modulators 35R, 35G, 35B to the cross dichroic prism 38 and fixing frames, but the optical function is focused herein. The structure of the optical device 30 including the supporting substrates and fixing frames will be described later. The optical modulator 35R is a rectangular transmissive liquid crystal panel consisting of an incident polarizing plate 31R, a liquid crystal light valve 32R, and a irradiating polarizing plate 33R. The R-light component out of the relay optical system 19 that has passed through the incident polarizing plate 31R is modulated across the liquid crystal light valve 32R on the basis of the image information of the R-light, and then sent inside the cross dichroic prism 38 through the irradiating polarizing plate 33R as a modulated R-light component for displaying image of the R-light component.

On the other hand, the light modulators 35G, 35B have the same configuration as the light modulator 35R. For the light modulator 35G, the G-light component that has passed through the incident polarizing plate 31G is modulated across the liquid crystal light valve 32G on the basis of the image information of the G-light component, and then sent inside the cross dichroic prism 38 through the irradiating polarizing plate 33G as a modulated G-light component for displaying image of the G-light component. Further, for the light modulator 35B, the B-light component that has passed through the incident polarizing plate 31B is modulated across the liquid crystal light valve 32B on the basis of the image information of the B-light component, and then sent inside the cross dichroic prism 38 through the irradiating polarizing plate 33B as a modulated B-light component for displaying image of the B-light component.

The cross dichroic prism 38, a cube, combines the modulated light components across the light modulators 35R, 35G, 35B for each color light component and then irradiates the combined-modulated light component to display an image with full colors through the irradiating surface So. The cross dichroic prism 38 is formed of four bonded rectangular prisms and the dichroic films fa, fb cross each other in the letter X, when seen from the upper surface of the projector 100 (plan view of FIG. 2)

The dichroic film fa is a dielectric multilayer film that transmits G- and B-light components and reflects an R-light component and the dichroic film fb is a dielectric multilayer film that transmits R- and G-light components and reflects a B-light component. The cross dichroic prism 38 transmits the green modulated light component out of the light modulator 35G and overlaps the red modulated light component out of the light modulator 35R and the blue modulated light component out of the light modulator 35B with the green modulated light component. After overlapping, the cross dichroic prism 38 irradiates the combined-modulated light component that includes image with full colors of three modulated primary colors to the projecting unit 50.

The modulated light component irradiated from the cross dichroic prism 38 is projected as an image with full colors onto a screen in a magnification scale by the projecting unit 50 that is a wide angle zoom lens formed by assembling a plurality of Gauss type lenses.

Further, the projector 100 is equipped with a plurality of cooling fans F1, F2, F3 for cooling the heat generating units, such as the optical device 30, power unit 54, lamp operating unit 55 etc, and exhausting fan F4 for discharging heat from the cooling fans outside. The cooling fan F1, axial fan, takes the outside air inside through an intake port open to the outside and cools the adjacent power unit 54 and lamp operating unit 55 simultaneously.

The cooling fans F2, F3, sirocco fans with outlet port facing the optical device 30, blow the air throughout the optical device 30. The optical device 30 has a three-dimensional structure with appropriate gaps for allowing the cooling air effectively blows from the cooling fans (see FIG. 3).

The exhaust fan F4 takes heat inside the projector 100 and discharges it through the exhausting port 56.

Schematic Configuration of Optical Device

Figure 3:
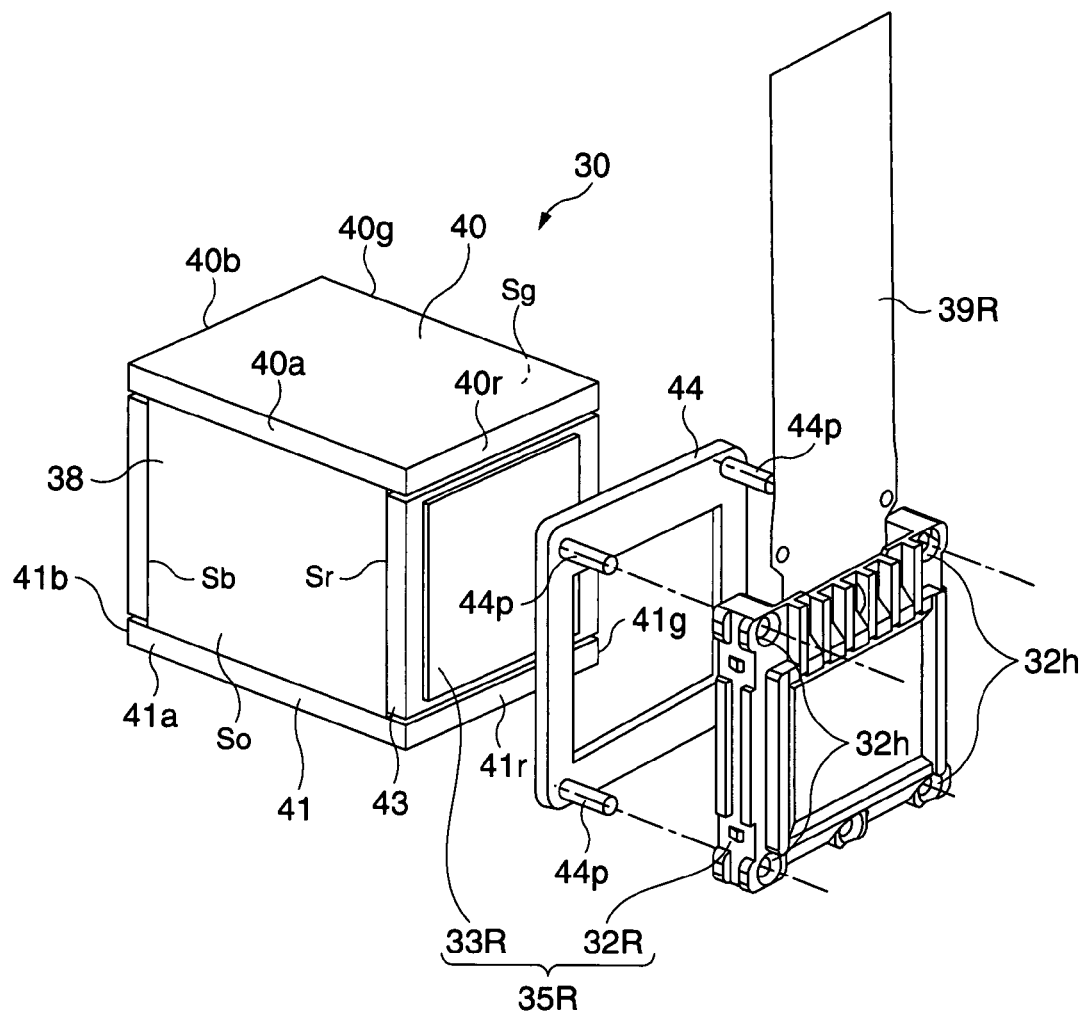
FIG. 3 is a perspective assembly view of an optical device.

FIG. 3 is an assembly view of an optical device according to an embodiment of the invention. FIG. 3 shows the attachment structure of only the light modulator 35R for R-light component to simplify explanation. Further, the incident polarizing plate 31R (FIG. 2), one of the light components of the light modulator 35R, is not shown in FIG. 3.

The incident polarizing plate 31R, for example, may be bonded to the irradiating surface of the collimating lens 20 (FIG. 2), which is applied to the incident polarizing plates 31G, 31B the same (FIG. 2).

The configuration of the optical device 30 of the projector 100 is schematically described hereafter with reference to FIG. 3.

The optical device 30 has the light modulators 35R, 35G, 35B for each color light component mounted on the corresponding incident surfaces Sr, Sg, Sb that are the three sides except the irradiating surface So of the rectangular cross dichroic prism 38 (35G and 35B are not shown). The light modulators each are fixed to corresponding incident surface Sr, Sg, Sb by a heat discharge plate 43, supporting substrates 40, 41, and fixing frame 44. The cross dichroic prism 38 is made of an optical glass, such as BK 7 (heat conductivity of about 1.114 W/m·K), a typical borosilicate glass.

The attachment structure of the light modulator 35R for an R-light component, on behalf of the others, is described hereafter. Further, the light modulators 35G, 35B (not shown) are also fixed to the incident surfaces Sg, Sb, respectively, the same as the light modulator 35R.

The heat discharge plate 43 of a transparent plate is bonded to the incident surface Sr of the cross dichroic prism 38. The heat discharge plate 43 is substantially the same as the incident surface Sr in size, but sized such that it does not protrude beyond each side of the incident surface. The heat discharge plate 43 is made of a material with good heat conductivity such as a sapphire with a conductivity in the range of about 42 W/m·K or a crystal with a conductivity in the range of about 5 to 10 W/m·K. Further, the irradiating polarizing plate 33R of the optical modulator 35R has been bonded in advance to the incident surface for the modulated R-light component of the heat discharge plate 43.

The supporting substrates 40, 41 of the same transparent plate as the cross dichroic prism 38 are bonded to the upside and bottom of the cross dichroic prism 38. A material with the same coefficient of thermal expansion as the cross dichroic prism is preferable for the supporting substrate 40, 41.

As for the assembly order for the optical device 30, first, a heat discharge plate 43 with irradiating polarizing plate bonded is fixedly attached to the incident surfaces Sr, Sg, Sb of the cross dichroic prism 38 and then the supporting substrates 40, 41 are fixedly attached to the upside and bottom of the cross dichroic prism 38, respectively. In the assembly, the others around the cross dichroic prism 38 is the same as in FIG. 3.

The supporting substrate 40 has a rectangular shape similar to the upside of the cross dichroic prism 38 and is disposed such that four sides 40a, 40r, 40g, 40b of the rectangular shape in the thickness direction are substantially level with the irradiating surface So and incident surfaces Sr, Sg, Sb of the cross dichroic prism 38, respectively. In detail, the side 40a is arranged with the irradiating surface So, while the other sides 40r, 40g, 40b each protrude beyond the incident surfaces Sr, Sg, Sb. The amount of protrusion of the sides 40r, 40g, 40b is set such that they covers a side in the width direction of the heat discharge plate 43.

Similar to the supporting substrate 40, for the supporting substrate 41, a side 41a is arranged with the irradiating surface So, while the other sides 41r, 41g, 41b protrude beyond the incident surfaces Sr, Sg, Sb.

The fixing frame 44 is fixed at the side 40r of the supporting substrate 40 and the side 41r of the supporting substrate 41. The fixing frame 44 is made of a metal with a black coating or a synthetic resin to prevent reflection. Aluminum, magnesium, or an alloy including them with good heat conductivity, or synthetic resin with good heat conductivity is preferable for a material for the fixing frame 44.

The side of the fixing frame 44 that faces the cross dichroic prism 38 is flat and the portion that faces the side 40r of the supporting substrate 40 and the side 41r of the supporting substrate 41 are fixedly bonded as the boding area.

Further, four pins 44p are formed at four corners on the fixing frame 44 on the side opposite to guide and fix the liquid light valve 32R. An adhesive including a UV curable resin is used for bonding the sides 40r, 41r to the frame 44. Detailed method of bonding will be described later.

The liquid crystal light valve 32R has holes 32h larger than the corresponding four pins 44p of the frame 44.

The liquid crystal light valves 35R, 35G, 35B are aligned to the corresponding incident surfaces Sr, Sg, Sb of the cross dichroic prism 38 by fixing the liquid crystal light valves to the corresponding fixing frames 44 in advance and sliding and precisely fitting the sides 40r, 41r of the supporting substrates 40, 41 to the surfaces facing the cross dichroic prism 38 of the fixing frames 44 with the liquid crystal light valves fixed while checking an projecting image by the combined-modulated light component irradiated through the irradiating surface So. Alternatively, it may be preferable to align them by using the clearances between the holes 32h of the liquid light valves and the pins 44p of the fixing frames 44 after fixing the fixing frames 44 to corresponding incident surfaces Sr, Sg, Sb of the cross dichroic prism 38.

In the alignment, an adhesive containing UV curable resin is applied to each bonding surface or filled in each hole 32h and then the liquid crystal light valves 35R, 35G, 35B are fixed by irradiating UV rays after the alignment is completed.

Image information about an R-light component and driving signals for scan-display driving of the liquid crystal light valve 32R are sent by a flexible substrate that connecting the circuit unit 53 (FIG. 1) and liquid crystal light valve 32R.

Method of Bonding Supporting Substrate

Figure 4:
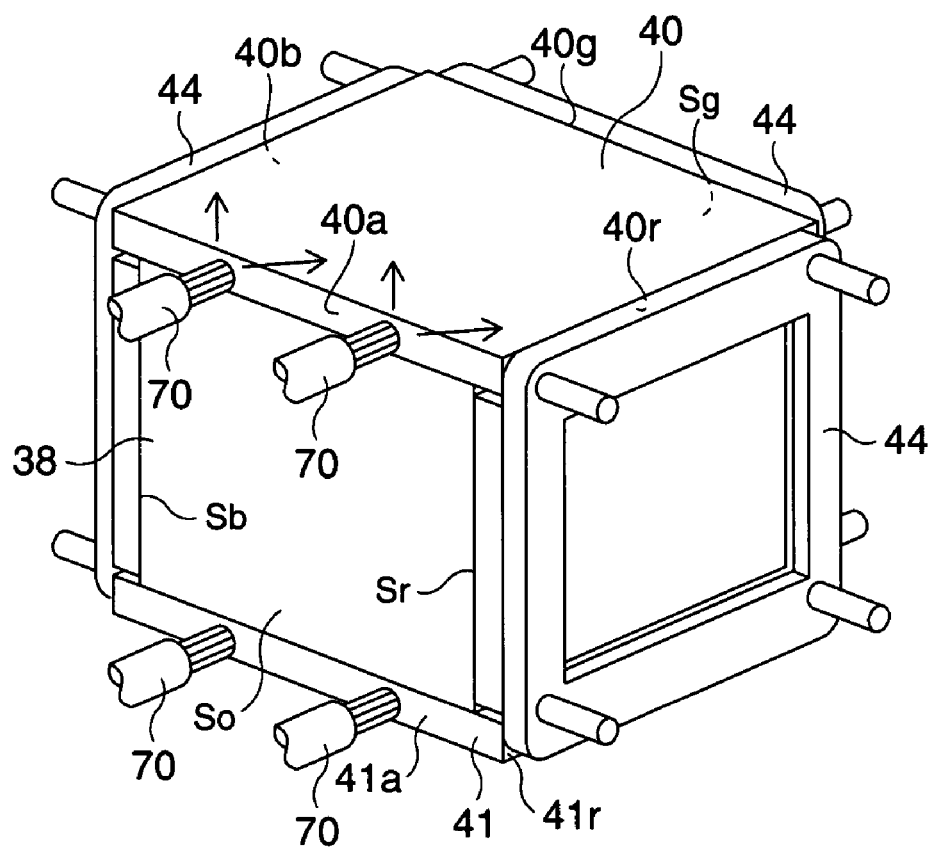
FIG. 4 is a perspective view illustrating bonding process for a supporting substrate.
Figure 5:
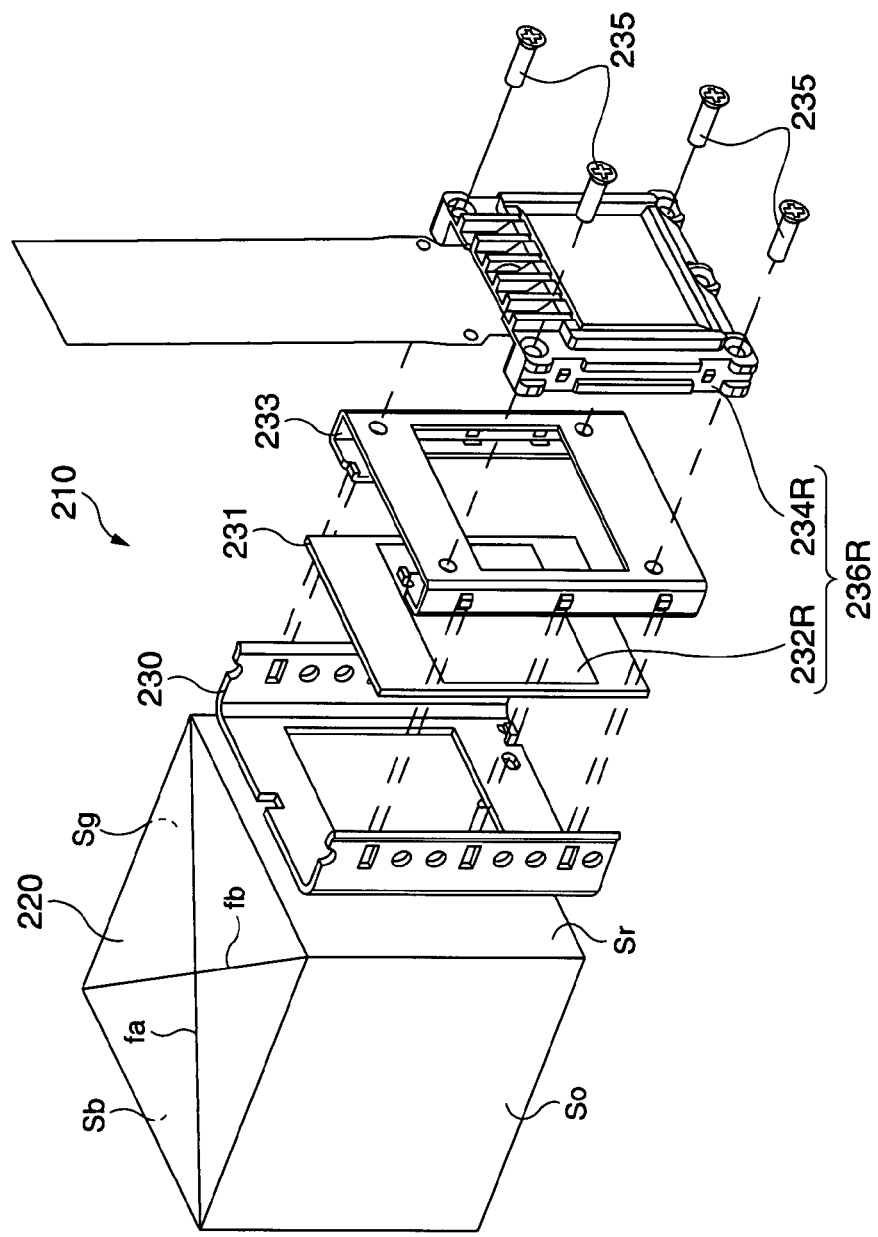
FIG. 5 is a perspective assembly view of an optical device in the related art.
Figure 6:
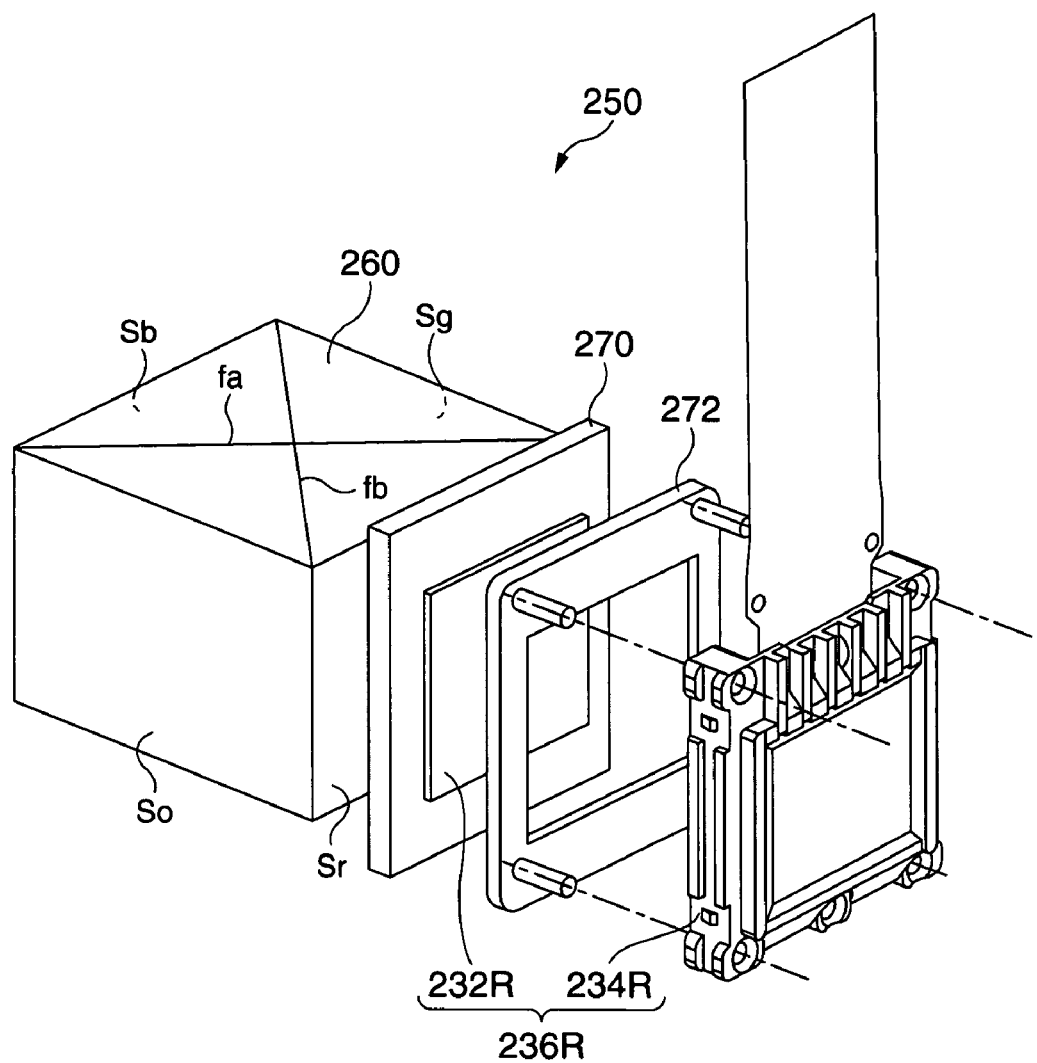
FIG. 6 is a perspective assembly view of another optical device in the related art.

FIG. 4 is a perspective view illustrating a process of bonding a supporting substrate according to an embodiment of the invention. FIG. 4 illustrates a process of bonding three fixing frames 44 to the supporting substrates 40, 41 of the optical device 30 of FIG. 3. Although only the fixing frames 44 are shown too simplify explanation, the liquid crystal light valves 35R, 35G, 35B may be fixed in advance to corresponding fixing frames.

A method of bonding three fixing frames 44 to the supporting substrate 40, 41 is now described with reference to FIG. 4.

The supporting substrates 40, 41 are fixed in advance to the upside and bottom of the cross dichroic prism 38, respectively. An adhesive containing a UV curable resin is applied on the sides 40r, 41r of the supporting substrates 40, 41 corresponding to the incident surface Sr and a frame 44 is temporarily fixed by a guide plate (not shown). Similarly, frames 44 each are also temporarily fixed to the sides 40g, 41g (not shown) at the incident surface Sg and the sides 40b, 41b (not shown) corresponding to the incident surface Sb.

Two irradiating units 70 are set at the side 40a of the supporting substrate 40 and the side 41a of the supporting substrate 41, respectively, corresponding to the irradiating surface So of the cross dichroic prism 38.

The irradiating unit 70 is the UV-ray irradiating portion of an UV-ray irradiator (not shown) that generates UV rays within 200 to 450 nm wavelength. The UV-ray irradiator is preferable to obtain irradiation strength around 365 nm wavelength, induces UV rays generated at a main body with a light guide cable, such as a glass fiber, and irradiates it through the irradiating unit 70.

In the side 40a of the supporting substrate 40, UV rays irradiated into the supporting substrates from two irradiating unit 70 facing the irradiating portion at the side repeatedly reflect off the upper and lower surface and each side of the supporting substrate 40 and are irradiated to the sides 40r, 40g, 40b with uniform luminous intensity. Further, similarly, for the side 41a of the supporting substrate 41, UV rays irradiated into the supporting substrates from two irradiating unit 70 facing the irradiating portion at the side repeatedly reflect off the upper and lower surface and each side of the supporting substrate 41 and are irradiated to the sides 41r, 41g, 41b (not shown for the sides 41g, 41b) with uniform luminous intensity.

Accordingly, the UV curable resin of the adhesive applied to the sides 40r, 40g, 40b and 41r, 41g, 41b is solidified and the fixing frames 44 are fixed to each side.

As described above, according to the embodiment, the following effects can be achieved.

(1) While the light modulators 35R, 35G, 35B face corresponding incident surfaces Sr, Sg, Sb of the cross dichroic prism 38, the liquid light valves 32R, 32G, 32B, one of the light components are supported by the supporting substrates 40, 41 mounted to the upside and bottom of the cross dichroic prism 38, respectively.

Therefore, in the optical device 30, even though the supporting substrates 40, 41 are different from the cross dichroic prism 38 in coefficient of thermal expansion, the supporting substrates changes in the dimension in the plane direction generate in the direction perpendicular to the alignment direction of the light modulators 35R, 35G, 35B. Therefore, it may be possible to reduce pixel displacements with simple structure of the supporting substrates 40, 41 on the upside and bottom of the cross dichroic prism 38. Accordingly, the optical device 30 with reduced pixel displacements is provided by the simple structure.

Since the fixing frame 44 that supports the liquid crystal light valves 32R, 32G, 32B is bonded at the side 40r of the supporting substrate 40 and the side 41r of the supporting substrate 41 as the boding areas, the cross dichroic prism 38 can be formed thin as much as the thickness of the supporting substrates 40, 41. Accordingly, it may be possible to save cost of the cross dichroic prism 38.

(2) Because the supporting substrates 40, 41 are made of a material with the same coefficient of thermal expansion as the cross dichroic prism 38, the ratio of changes in dimension and temperature is the same as that of the cross dichroic prism 38.

Accordingly, it may be possible to prevent relative displacements of the light modulators 35R, 35G, 35B to the cross dichroic prism 38 and pixel displacements are reduced accordingly.

When three fixing frames 44 are fixed, it may be possible to irradiate uniform UV rays to the sides 40r, 40g, 40b and 41r, 41g, 41b to use the supporting substrates 40, 41 as a light guide body, by irradiating UV rays through the sides 40a, 41a. Consequently, the UV-ray curable resin of the adhesive applied to the surfaces 40r, 40g, 40b and 41r, 41g, 41b is solidified and the fixing frames 44 are fixed to corresponding sides. Accordingly, since the supporting substrates 40, 41 can be used as a light guide body when the fixing frames 44 are bonded to the cross dichroic prism 38, assembly efficiency is improved.

Accordingly, the optical device 30 with improved assembly efficiency and reduced pixel displacements can be provided.

(3) Since a discharge plate 43 with the irradiating polarizing plate 33R, 33G, 33B bonded in advance is bonded to the incident surfaces Sr, Sg, Sb of the cross dichroic prism 38, the irradiating polarizing plates are each substantially integrally formed with the cross dichroic prism 38 through the discharge plate 43.

Heat from the irradiating polarizing plates 33R, 33G, 33B, which are difficult to cool because they are disposed close to the cross dichroic prism 38, is discharged to the cross dichroic prism 38 with large heat capacity through each heat discharge plate 43, so that it may be possible to ensure performance of the irradiating polarizing plates.

The heat conductivity of the heat discharge plate 43 of a sapphire or crystal is larger than that of the cross dichroic prism 38 of an optical glass, such as BK 7. Therefore, heat of the irradiating polarizing plates 33R, 33G, 33B can be effectively transmitted to the cross dichroic prism 38.

Accordingly, the optical device 30 is provided with high reliability.

(4) The projector 100 has the optical device 30 with high reliability that reduces pixel displacements from the simple configuration.

Accordingly, the projector 100 can project clear images with high reliability.

The invention is not limited to the above embodiments and may be modified other than the embodiments. Exemplary modifications are described below.

Modification 1

A first modification is now described with reference to FIG. 3. According to the above embodiments, the heat discharge plate 43 is made of a sapphire or crystal with good heat conductivity, but may be made of other materials with the same or more heat conductivity than the cross dichroic prism 38. For example, the heat discharge plate 43 may be made of an optical glass, such as BK 7, the same as the material for the cross dichroic prism 38.

According to this configuration, it may be possible to discharge heat from the irradiating polarizing plates 33R, 33G, 33B to the cross dichroic prism 38 with the same heat conductivity through corresponding heat discharge plate 43, without stagnation. Further, three heat discharge plates 43 can be provided from an inexpensive optical glass, which saves cost of the optical device 30.

Modification 2

A second modification is now described with reference to FIG. 2. According to the above embodiments, the optical device 30 has the light modulators 35R, 35G, 35B of a transmissive liquid crystal panel, but is not limited thereto. An optical device equipped with transparent supporting substrates for fixing light modulators to a light combination optical system is applicable to the invention.

For example, an optical device with light modulators of two, or four or more transmissive liquid crystal panels is applicable to the invention. Alternatively, an optical device with light modulators of three reflective liquid crystal panels is applicable to the invention. Further, an optical device including a tilt mirror device is also applicable to the invention. The same effects as the above embodiments and modifications can be achieved from the above-mentioned configurations.

The entire disclosure of Japanese Patent Application No. 2006-119022, filed Apr. 24, 2006 is expressly incorporated by reference herein.

What is claimed is:

1. An optical device comprising:
a plurality of light modulators that modulate a plurality of color light components according to image information about each of the color light components, portions of the light modulators being attached to fixing frames;
a combining optical unit having an upside, a bottom, an irradiating surface and a plurality of incident surfaces, the combining optical unit configured to combine each of the modulated color light components and irradiate the combined modulated color light components outside of the optical device through the irradiating surface, wherein the light modulators are arranged to face corresponding incident surfaces which the modulated color light components pass through, parts of the light modulators being supported by supporting substrates mounted at the upside and the bottom of the combining optical unit, wherein the supporting substrates and the fixing frames are fixed together by an adhesive comprising a UV-ray curable resin, the supporting substrates made of a same optically transparent glass material and having a same coefficient of thermal expansion as the combining optical unit, and wherein the supporting substrates have rectangular shapes similar in shape to the upside and the bottom of the combining optical unit, the supporting substrates being bonded to the combining optical unit such that one of the four sides of each of the rectangular shapes in a thickness direction is arranged flush with the irradiating surface of the combining optical unit, and the other sides protrude beyond the incident surfaces of the combining optical unit to form protruding portions; and a plurality of heat discharge plates, each of the plates attached to one of the incident surfaces of the combining optical unit and interposed between the protruding portions of the supporting substrates.

2. The optical device according to claim 1, wherein:

the plurality of heat discharge plates are each formed of a transparent material and have a higher heat conductivity than the combining optical unit and are substantially the same in size as each of the incident surfaces, and the light modulators each comprise a liquid crystal panel having an incident polarizing plate and an irradiating polarizing plate, each of the heat discharge plates is bonded to one of the incident surfaces of the combining optical unit, and each of the irradiating polarizing plates is in close contact with one of the heat discharge plates.

3. A projector comprising:

the optical device according to claim 1;

a light source unit that supplies a light component to the optical device; and a projecting unit that projects the combined modulated light components irradiated through the irradiating surface of the optical device in a magnification scale.

4. The optical device according to claim 1, wherein each heat discharge plate is substantially the same in size as each of the incident surfaces and does not protrude beyond the incident surfaces.

5. The optical device according to claim 1, further comprising an irradiating polarizing plate bonded to each of the plurality of heat discharge plates.

6. The optical device according to claim 1, wherein the protruding portions extend to a width equal to a width of each of the plurality of heat discharge plates.

* * * * *